US012341766B2

(12) United States Patent
Pan et al.

(10) Patent No.: US 12,341,766 B2
(45) Date of Patent: Jun. 24, 2025

(54) COMMUNICATION METHOD, TERMINAL DEVICE, ROAD SIDE UNIT, SERVER, SYSTEM, AND MEDIUM

(71) Applicant: SHENZHEN YINWANG INTELLIGENT TECHNOLOGIES CO., LTD., Shenzhen (CN)

(72) Inventors: Kai Pan, Shanghai (CN); Jing Chen, Shanghai (CN)

(73) Assignee: Shenzhen Yinwang Intelligent Technologies Co., Ltd., Shenzhen (CN)

(*) Notice: Subject to any disclaimer, the term of this patent is extended or adjusted under 35 U.S.C. 154(b) by 328 days.

(21) Appl. No.: 17/842,388

(22) Filed: Jun. 16, 2022

(65) Prior Publication Data
US 2022/0311602 A1 Sep. 29, 2022

Related U.S. Application Data

(63) Continuation of application No. PCT/CN2020/128288, filed on Nov. 12, 2020.

(30) Foreign Application Priority Data

Dec. 18, 2019 (CN) .......................... 201911310826.7

(51) Int. Cl.
*H04L 9/40* (2022.01)
*H04L 9/08* (2006.01)
*H04L 9/32* (2006.01)

(52) U.S. Cl.
CPC ........ *H04L 63/0823* (2013.01); *H04L 9/0825* (2013.01); *H04L 9/0872* (2013.01); *H04L 9/3263* (2013.01)

(58) Field of Classification Search
CPC .... H04L 9/0825; H04L 9/0872; H04L 9/3263
See application file for complete search history.

(56) References Cited

U.S. PATENT DOCUMENTS 11,363,010 B2 * 6/2022 Wang .................. H04L 63/0823
12,063,294 B2 * 8/2024 Dai ..................... H04W 12/033
(Continued)

FOREIGN PATENT DOCUMENTS

| CN | 102624917 A | 8/2012 |
| CN | 106027233 A | 10/2016 |

(Continued)

OTHER PUBLICATIONS

Office Action in Chinese Appln. No. 201911310826.7, dated Nov. 3, 2021, 27 pages (with English translation).

(Continued)

*Primary Examiner* — Stephen T Gundry
(74) *Attorney, Agent, or Firm* — Fish & Richardson P.C.

(57) ABSTRACT

The present disclosure provides example terminal devices, road side units, and servers. One example terminal device performs operations including sending certificate request information to a certificate authority server, where the certificate request information includes identity information of the terminal device. A communication key sent by the certificate authority server is received by the terminal device. Encrypted information that is sent by a road side unit is received by the terminal device, where the encrypted information is information encrypted by using the communication key. The encrypted broadcast information is decrypted by the terminal device by using the communication key.

8 Claims, 8 Drawing Sheets

(56) References Cited

U.S. PATENT DOCUMENTS

| | | |
|---|---|---|
| 2008/0204278 A1 | 8/2008 | Tsuzuki et al. |
| 2010/0014674 A1 | 1/2010 | Lin |
| 2011/0213968 A1 | 9/2011 | Zhang et al. |
| 2014/0303881 A1* | 10/2014 | Ando .................. H04L 63/0823 |
| | | 701/117 |
| 2019/0123915 A1* | 4/2019 | Simplicio, Jr. ........... H04L 9/30 |
| 2019/0335304 A1* | 10/2019 | Yabuuchi ................ H04W 4/44 |
| 2020/0228988 A1* | 7/2020 | Yang ................... H04L 63/1466 |
| 2020/0259820 A1* | 8/2020 | McCall ................. H04L 9/3239 |
| 2020/0336908 A1* | 10/2020 | Kim ..................... H04W 12/062 |
| 2020/0382320 A1* | 12/2020 | Ogawa ................... H04L 9/006 |
| 2021/0006418 A1* | 1/2021 | Wei ........................ H04L 9/3247 |
| 2021/0014055 A1* | 1/2021 | Zhang ................... H04L 9/3268 |
| 2021/0058396 A1* | 2/2021 | Nathanson .......... H04L 61/3025 |
| 2021/0058471 A1* | 2/2021 | Acharya ..................... G06F 8/65 |
| 2021/0142585 A1* | 5/2021 | Murray ................... H04W 4/06 |
| 2021/0167972 A1* | 6/2021 | Zang ................... H04L 63/0823 |
| 2021/0226793 A1* | 7/2021 | Yu ......................... H04L 9/0877 |
| 2021/0226802 A1* | 7/2021 | Zhu ....................... H04W 12/06 |
| 2021/0258148 A1* | 8/2021 | Pan ........................ H04L 9/083 |
| 2022/0376931 A1* | 11/2022 | Simplicio, Jr. ......... H04L 67/12 |
| 2023/0007480 A1* | 1/2023 | Tian .................... H04W 12/069 |
| 2023/0370460 A1* | 11/2023 | Nathanson .......... H04L 12/1407 |
| 2024/0250836 A1* | 7/2024 | Simplicio, Jr. ........... H04L 9/30 |
| 2024/0323651 A1* | 9/2024 | Vanderveen .......... H04W 12/12 |

FOREIGN PATENT DOCUMENTS

| | | |
|---|---|---|
| CN | 107623912 A | 1/2018 |
| CN | 108243181 A | 7/2018 |
| CN | 108668258 A | 10/2018 |
| CN | 110519345 A | 11/2019 |
| CN | 110544138 A | 12/2019 |
| WO | 2019126861 A1 | 7/2019 |

OTHER PUBLICATIONS

Extended European Search Report in European Appln No. 20902228.4, dated Nov. 18, 2022, 10 pages.

International Search Report and Written Opinion in International Appln. No. PCT/CN2020/128288, mailed on Feb. 10, 2021, 15 pages (with English translation).

\* cited by examiner

COMMUNICATION METHOD, TERMINAL DEVICE, ROAD SIDE UNIT, SERVER, SYSTEM, AND MEDIUM

CROSS-REFERENCE TO RELATED APPLICATIONS

This application is a continuation of International Application No. PCT/CN2020/128288, filed on Nov. 12, 2020, which claims priority to Chinese Patent Application No. 201911310826.7, filed on Dec. 18, 2019. The disclosures of the aforementioned applications are hereby incorporated by reference in their entireties.

TECHNICAL FIELD

Embodiments of this application relate to communications technologies, and in particular, to a communication method, a terminal device, a road side unit, a server, a system, and a medium.

BACKGROUND

As internet of vehicles technologies develop, on board units (OBU) having a communication function are configured on increasingly more vehicles. A vehicle may directly exchange information with a road side unit (RSU) by using an OBU or user equipment (UE).

Currently, when driving a vehicle on a highway, a driver usually obtains related information such as information about a road ahead or value-added service information by using an electronic display or a radio broadcast. However, there is no differential processing for the receiving vehicle on a release form of information from the electronic display or the radio broadcast. Currently, an RSU is deployed only at an electronic toll collection (ETC) at an entrance or exit of the highway, and the RSU is mainly configured to implement vehicle recognition. The RSU releases information outside in a broadcast manner. That is, all vehicles may receive the information broadcast by the RSU. As a result, it is difficult to achieve an objective that only a specific target vehicle can receive the information broadcast by the RSU.

Therefore, how to implement an objective that only a vehicle having a specific attribute can receive related pushed information is a problem that needs to be urgently resolved currently.

SUMMARY

This application provides a communication method, a terminal device, a road side unit, a server, a system, and a medium, to resolve a problem that an RSU cannot push related information to a vehicle having a specific attribute in the conventional technology.

To achieve the foregoing objective, the following technical solutions are used in this application.

According to a first aspect, this application provides a communication method, including: receiving a trigger instruction at a preset node location of a road section; sending certificate request information, where the certificate request information includes identity information of a terminal device; receiving a communication key sent by a certificate authority CA server; receiving encrypted information sent by a road side unit RSU, where the encrypted information is information encrypted by using the communication key; and decrypting the encrypted information by using the communication key.

In this embodiment, the CA server determines permission of the terminal device based on the identity information in the certificate request sent by the terminal device, and delivers the communication key to the terminal device when the permission of the terminal device meets a preset permission requirement, so that only the terminal device that meets the preset permission requirement can decrypt, by using the communication key, the encrypted information sent by the RSU. The RSU encrypts, by using the communication key sent by the CA server, the information that is sent externally, so that only a vehicle that meets a specific attribute requirement can decrypt the received information, so as to receive related pushed information. This implements an objective of providing differentiated services for vehicles having different features.

In a possible design, the encrypted information is encrypted broadcast information, and the encrypted broadcast information includes a broadcast identifier.

In this embodiment, after receiving the information, an OBU may determine, in a manner of identifying the broadcast identifier, that the information sent by the RSU is the encrypted broadcast information, so as to decrypt the encrypted broadcast information by using the communication key, so that only a vehicle that meets the specific attribute requirement in vehicles that can receive the broadcast information can decrypt the received encrypted broadcast information.

In a possible design, before the sending certificate request information, the method further includes; generating a first key pair, where the first key pair includes a first private key and a first public key, and the certificate request information includes the first public key.

In this embodiment, after receiving the certificate request information that is sent by the OBU and that includes the first public key, the CA server may sign the certificate request information by using a CA private key, to generate a communication certificate.

In a possible design, the first public key is used to encrypt the communication key.

In this embodiment, in a transmission process of the communication key, the communication key is encrypted by using the first public key, and the encrypted communication key is decrypted after the OBU receives the communication key. This ensures transmission security of the communication key.

In a possible design, the receiving a communication key sent by a CA server includes: receiving a communication certificate sent by the CA server; establishing a secure transmission channel between the terminal device and the CA server based on the communication certificate; and receiving, through the secure transmission channel, the communication key sent by the CA server.

In this embodiment, the secure transmission channel is first established based on the communication certificate, and then the communication key is transmitted through the established secure transmission channel. This ensures transmission security of the communication key.

In a possible design, after the generating a first key pair, the method further includes: encrypting the certificate request information, where the sent certificate request information is encrypted certificate request information.

In this embodiment, the certificate request information is encrypted. This ensures security of the certificate request information in a transmission process.

In a possible design, the encrypting the certificate request information includes: encrypting the certificate request information by using a preset CA server public key.

In this embodiment, the certificate request information is encrypted by using the public key of the CA server. This ensures security of the certificate request information in a transmission process.

In a possible design, the encrypting the certificate request information includes: generating a symmetric key, and encrypting the certificate request information by using the symmetric key; and encrypting the symmetric key by using a preset CA server public key, and sending an encrypted symmetric key.

In this embodiment, the certificate request information is encrypted by using the symmetric key, and the symmetric key is encrypted by using the CA server public key, and then the encrypted symmetric key is sent. This can improve efficiency of encrypting the certificate request information by the OBU and decrypting the certificate request information by the CA server while ensuring security of the certificate request information sent by the OBU to the CA server.

In a possible design, before the decrypting the encrypted information by using the communication key, the method further includes: determining, according to a preset rule, a communication key currently used for decrypting information.

In this embodiment, the communication key currently used for decrypting information in the OBU is determined by setting the preset rule. This implements synchronization between the communication keys currently used by the OBU and the RSU.

In a possible design, the determining, according to a preset rule, a communication key currently used for decrypting information includes; receiving an encrypted first communication key sent by the RSU; receiving, according to the preset rule, a second communication key sent by the CA server; and decrypting the encrypted first communication key by using the second communication key.

In this embodiment, the OBU receives, according to the preset rule, the encrypted first communication key sent by the RSU, and decrypts the encrypted first communication key by using the second communication key sent by the CA server. Therefore, the RSU has a management function for the first communication key used to encrypt the broadcast information.

In a possible design, the preset rule is a time rule.

In this embodiment, the preset rule is set as the time rule, so that the OBU and the RSU synchronize the currently used communication key according to the time rule.

In a possible design, the time rule is a preset fixed time period or a preset fixed time point.

In a possible design, after the sending certificate request information, the method further includes: re-sending the certificate request information according to the time rule within a validity period of the communication key, so as to update the communication key used for decrypting information.

In this embodiment, the OBU re-sends the certificate request information before the validity period of the communication key expires, so as to update the communication key used for decrypting information. This avoids information service interruption when the communication key is updated.

In a possible design, the determining, according to a preset rule, a communication key currently used for decrypting information includes: receiving a first communication key sequence, where the first communication key sequence includes a plurality of communication keys, and total duration of validity periods of all communication keys in the first communication key sequence is greater than preset duration; and determining, according to the time rule, one communication key in the first communication key sequence as the communication key currently used for decrypting information.

In this embodiment, the CA server delivers a sufficient quantity of communication keys to the OBU, so that the OBU does not need to apply for a communication key from the CA server again within the preset duration. This can further ensure continuity of information services of the OBU within the preset duration.

In a possible design, before the decrypting the encrypted information by using the communication key, the method further includes: verifying the encrypted information by using a preset RSU public key.

In this embodiment, the OBU verifies the encrypted information by using the preset RSU public key, and decrypts the encrypted information by using Kc if the verification succeeds, so as to process the signed and then encrypted information, and obtain pushed information.

In a possible design, after the decrypting the encrypted information by using the communication key, the method further includes: verifying decrypted information by using a preset RSU public key.

In this embodiment, the OBU first performs decryption by using Kc, and then verifies the decrypted information by using the preset RSU public key, so as to process the signed and then encrypted information, and obtain pushed information.

In a possible design, after the receiving a trigger instruction, the method further includes: sending the identity information and a payment status, where if the payment status corresponds to a payment success state, permission of the terminal device meets a preset permission requirement.

In this embodiment, when determining, based on the payment information of the terminal device, whether the permission of the terminal device meets the preset permission requirement, the CA server determines whether to deliver the communication key to the terminal device, so that only a terminal device that pays fees can decrypt, by using the communication key, the encrypted information sent by the RSU, and receive related pushed information. This achieves an information value-added service for the vehicle.

In a possible design, the terminal device is an on board unit OBU or user equipment UE According to a second aspect, this application further provides a communication method, including: receiving a communication key sent by a CA server, where the communication key is used to encrypt information that is sent externally; and sending encrypted information.

In this embodiment, the CA server determines permission of a terminal device based on identity information in the certificate request sent by the terminal device, and delivers the communication key to the terminal device when the permission of the terminal device meets a preset permission requirement, so that only the terminal device that meets the preset permission requirement can decrypt, by using the communication key, the encrypted information sent by an RSU. The RSU encrypts, by using the communication key sent by the CA server, the information that is sent externally, so that only a vehicle that meets a specific attribute requirement can decrypt the received information, so as to receive related pushed information. This implements an objective of providing differentiated services for vehicles having different features.

In a possible design, the encrypted information is encrypted broadcast information, and the encrypted broadcast information includes a broadcast identifier.

In this embodiment, after receiving the information, an OBU may determine, in a manner of identifying the broadcast identifier, that the information sent by the RSU is the encrypted broadcast information, so as to decrypt the encrypted broadcast information by using the communication key, so that only a vehicle that meets the specific attribute requirement in vehicles that can receive the broadcast information can decrypt the received encrypted broadcast information.

In a possible design, before the sending encrypted information, the method further includes: encrypting only information that is sent externally and that meets a preset service type requirement.

In this embodiment, only the information that is sent externally and that meets the preset service type requirement is encrypted, so that an RSU with permission can obtain information corresponding to a preset service type.

In a possible design, before the sending encrypted broadcast information, the method further includes: determining, according to a preset rule, a communication key currently used for encrypting information.

In this embodiment, the RSU determines the currently used communication key according to the preset rule, so that the RSU manages a plurality of communication keys. This ensures that a communication key currently used by the OBU is the same as or corresponds to the communication key currently used by the RSU.

In a possible design, after the determining, according to a preset rule, a communication key currently used for encrypting information, the method further includes: encrypting a first communication key by using a second communication key, where the first communication key is used to encrypt broadcast information; and sending encrypted first communication key according to the preset rule.

In this embodiment, the OBU receives, according to the preset rule, the encrypted first communication key sent by the RSU, and decrypts the encrypted first communication key by using the second communication key sent by the CA server. Therefore, the RSU has a management function for the first communication key used to encrypt the broadcast information.

In a possible design, the preset rule is a time rule.

In this embodiment, the preset rule is set as the time rule, so that the OBU and the RSU synchronize the currently used communication key according to the time rule.

In a possible design, the time rule is a preset fixed time period or a preset fixed time point.

In a possible design, before the sending encrypted information, the method further includes: receiving a second communication key sequence, where the second communication key sequence includes a plurality of communication keys; and sequentially selecting, according to the time rule, a communication key in the second communication key sequence as a communication key for encrypting information.

In this embodiment, the CA server delivers a plurality of communication keys to the RSU, so that the RSU maintains the plurality of communication keys according to the time rule. This ensures continuity of information services provided by the RSU.

In a possible design, before the sending encrypted information, the method further includes: signing broadcast information by using a road side unit RSU private key; encrypting the broadcast information by using the communication key; and sending the encrypted broadcast information.

In this embodiment, the RSU first signs the broadcast information by using the RSU private key, and then encrypts the broadcast information by using the communication key. This ensures transmission security of the broadcast information.

In a possible design, before the sending encrypted information, the method further includes: encrypting broadcast information by using the communication key; and signing the encrypted broadcast information by using a road side unit RSU private key.

In this embodiment, the RSU first encrypts the broadcast information by using the communication key, and then signs the encrypted broadcast information by using the road side unit RSU private key. This ensures transmission security of the broadcast information.

In a possible design, before the sending encrypted information, the method further includes: receiving identity information and payment information, where the identity information is used to represent an identity of an on board unit (a terminal device), and the payment information is used to determine a payment status of the terminal device; and sending the identity information and the payment status.

In this embodiment, when determining, based on the payment information of the terminal device, whether permission of the terminal device meets the preset permission requirement, the CA server determines whether to deliver the communication key to the terminal device, so that only a terminal device that pays fees can decrypt, by using the communication key, the encrypted broadcast information sent by the RSU, and receive related pushed information. This achieves an information value-added service for the vehicle.

According to a third aspect, this application further provides a communication method, including: receiving certificate request information, where the certificate request information includes identity information of an on board unit (a terminal device); determining permission of the terminal device based on the identity information; sending a communication key to the terminal device if the permission meets a preset permission requirement; and sending the communication key to a road side unit RSU according to a preset rule, where the communication key is used to encrypt information that is sent by the RSU externally.

In this embodiment, a CA server determines the permission of the terminal device based on the identity information in the certificate request sent by the terminal device, and delivers the communication key to the terminal device when the permission of the terminal device meets the preset permission requirement, so that only the terminal device that meets the preset permission requirement can decrypt, by using the communication key, encrypted information sent by the RSU. The RSU encrypts, by using the communication key sent by the CA server, the information that is sent externally, so that only a vehicle that meets a specific attribute requirement can decrypt the received information, so as to receive related pushed information. This implements an objective of providing differentiated services for vehicles having different features.

In a possible design, before the sending a communication key to the terminal device, the method further includes: signing the certificate request information by using a CA server private key, to generate a communication certificate, where the certificate request information includes a first public key; and sending the communication certificate, where the communication certificate is used to establish a transmission channel between the terminal device and the CA server.

In this embodiment, after receiving the certificate request information that is sent by the OBU and that includes the first public key, the CA server may sign the certificate request information by using the CA private key, so as to generate the communication certificate, and establish the transmission channel between the terminal device and the CA server by using the generated communication certificate.

In a possible design, before the sending a communication key to the terminal device, the method further includes: encrypting the communication key by using the first public key.

In this embodiment, in a transmission process of the communication key, the communication key is encrypted by using the first public key, and the encrypted communication key is decrypted after the OBU receives the communication key. This ensures transmission security of the communication key.

In a possible design, before the sending a communication key to the terminal device, the method further includes: establishing a secure transmission channel with the terminal device based on the communication certificate; and sending the communication key through the secure transmission channel.

In this embodiment, the secure transmission channel is first established based on the communication certificate, and then the communication key is transmitted through the established secure transmission channel. This ensures transmission security of the communication key.

In a possible design, before the sending a communication key to the terminal device, the method further includes: receiving encrypted certificate request information; and decrypting the encrypted certificate request information.

In this embodiment, the certificate request information is encrypted. This ensures security of the certificate request information in a transmission process.

In a possible design, the receiving encrypted certificate request information includes: receiving certificate request information encrypted by using a CA server public key; or receiving certificate request information encrypted by using a symmetric key and the symmetric key encrypted by using a CA server public key.

In this embodiment, the certificate request information is encrypted by using the symmetric key, and the symmetric key is encrypted by using the CA server public key, and then the encrypted symmetric key is sent. This can improve efficiency of encrypting the certificate request information by the OBU and decrypting the certificate request information by the CA server while ensuring security of the certificate request information sent by the OBU to the CA server.

In a possible design, the sending the communication key according to a preset rule includes: sending a second communication key according to the preset rule, where the communication key includes the second communication key, the second communication key is used to encrypt a first communication key, and the first communication key is used to encrypt broadcast information from the RSU.

In this embodiment, the OBU receives, according to the preset rule, the encrypted first communication key sent by the RSU, and decrypts the encrypted first communication key by using the second communication key sent by the CA server. Therefore, the RSU has a management function for the first communication key used to encrypt the broadcast information.

In a possible design, the preset rule is a time rule.

In this embodiment, the preset rule is set as the time rule, so that the OBU and the RSU synchronize the currently used communication key according to the time rule.

In a possible design, the time rule is a preset fixed time period or a preset fixed time point.

In a possible design, after the receiving certificate request information, the method further includes: re-receiving the certificate request information according to the time rule within a validity period of the communication key, so as to update the communication key.

In this embodiment, the OBU re-sends the certificate request information before the validity period of the communication key expires, so as to update the communication key used for decrypting information. This avoids information service interruption when the communication key is updated.

In a possible design, the sending a communication key to the terminal device includes: sending a first communication key sequence, where the first communication key sequence includes a plurality of communication keys, total duration of validity periods of all communication keys in the first communication key sequence is greater than preset duration, and the preset duration is determined based on a parameter of a road section on which the RSU is located.

In this embodiment, the CA server delivers a sufficient quantity of communication keys to the OBU, so that the OBU does not need to apply for a communication key from the CA server again within the preset duration. This can further ensure continuity of information services of the OBU within the preset duration.

In a possible design, the determining permission of the terminal device based on the identity information includes: receiving the identity information and a payment status, where if the payment status corresponds to a payment success state, the permission meets the preset permission requirement.

In this embodiment, when determining, based on the payment information of the terminal device, whether permission of the terminal device meets the preset permission requirement, the CA server determines whether to deliver the communication key including the communication key to the terminal device, so that only a terminal device that pays fees can decrypt, by using the communication key, the encrypted broadcast information sent by the RSU, and receive related pushed information. This achieves an information value-added service for the vehicle.

In a possible design, before the sending a communication key to the terminal device, the method further includes: determining the sent communication key based on a geographical area in which the RSU is located.

In this embodiment, the CA server sends different communication keys to RSUs located in different geographical areas, so as to implement separate management of broadcast information pushed in the different geographical areas.

According to a fourth aspect, this application further provides a terminal device, including: a receiving module, configured to receive a trigger instruction at a preset node location of a road section; a sending module, configured to send certificate request information, where the certificate request information includes identity information of the terminal device, where the receiving module is configured to receive a communication key sent by a certificate authority CA server; and the receiving module is further configured to receive encrypted information sent by a road side unit RSU, where the encrypted information is information encrypted by using the communication key; and a processing unit, configured to decrypt the encrypted information by using the communication key.

In a possible design, the encrypted information is encrypted broadcast information, and the encrypted broadcast information includes a broadcast identifier.

In a possible design, the processing module is further configured to generate a first key pair, where the first key pair includes a first private key and a first public key, and the certificate request information includes the first public key.

In a possible design, the first public key is used to encrypt the communication key.

In a possible design, the receiving module is specifically configured to: receive a communication certificate sent by the CA server; establish a secure transmission channel between the terminal device and the CA server based on the communication certificate; and receive, through the secure transmission channel, the communication key sent by the CA server.

In a possible design, the processing module is further configured to encrypt the certificate request information, and the sent certificate request information is encrypted certificate request information.

In a possible design, the processing module is specifically configured to: encrypt the certificate request information by using a preset CA server public key; or generate a symmetric key, and encrypt the certificate request information by using the symmetric key; and encrypt the symmetric key by using a preset CA server public key, and send an encrypted symmetric key.

In a possible design, the processing module is further configured to determine, according to a preset rule, a communication key currently used for decrypting information.

In a possible design, the processing module is specifically configured to: receive an encrypted first communication key sent by the RSU; receive, according to the preset rule, a second communication key sent by the CA server; and decrypt the encrypted first communication key by using the second communication key.

In a possible design, the preset rule is a time rule.

In a possible design, the time rule is a preset fixed time period or a preset fixed time point.

In a possible design, the sending module is further configured to re-send the certificate request information according to the time rule within a validity period of the communication key, so as to update the communication key used for decrypting information.

In a possible design, the processing module is specifically configured to: receive a first communication key sequence, where the first communication key sequence includes a plurality of communication keys, and total duration of validity periods of all communication keys in the first communication key sequence is greater than preset duration; and determine, according to the time rule, one communication key in the first communication key sequence as the communication key currently used for decrypting information.

In a possible design, the processing module is further configured to verify the encrypted broadcast information by using a preset RSU public key.

In a possible design, the processing module is further configured to verify decrypted broadcast information by using a preset RSU public key.

In a possible design, the sending module is further configured to send the identity information and a payment status, and if the payment status corresponds to a payment success state, permission of the terminal device meets a preset permission requirement.

According to a fifth aspect, this application further provides a road side unit, including: a receiving module, configured to receive a communication key sent by a CA server, where the communication key is used to encrypt information that is sent externally; and a sending module, configured to send encrypted information.

In a possible design, the encrypted information is encrypted broadcast information, and the encrypted broadcast information includes a broadcast identifier.

In a possible design, the road side unit further includes: a processing module, configured to encrypt only information that is sent externally and that meets a preset service type requirement.

In a possible design, the road side unit further includes: a processing module, configured to determine, according to a preset rule, a communication key currently used for encrypting information.

In a possible design, the processing module is further configured to encrypt a first communication key by using a second communication key, where the first communication key is used to encrypt broadcast information; and the sending module is further configured to send an encrypted first communication key according to the preset rule.

In a possible design, the preset rule is a time rule.

In a possible design, the time rule is a preset fixed time period or a preset fixed time point.

In a possible design, the receiving module is further configured to receive a second communication key sequence, where the second communication key sequence includes a plurality of communication keys; and the processing module is further configured to sequentially select, according to the time rule, a communication key in the second communication key sequence as a communication key for encrypting information.

In a possible design, the processing module is further configured to sign broadcast information by using a road side unit RSU private key; the processing module is further configured to encrypt the broadcast information by using the communication key; and the sending module is further configured to send the encrypted information.

In a possible design, the processing module is further configured to encrypt broadcast information by using the communication key; and the processing module is further configured to sign the encrypted broadcast information by using a road side unit RSU private key.

In a possible design, the receiving module is further configured to receive identity information and payment information, where the identity information is used to represent an identity of an on board unit OBU, and the payment information is used to determine a payment status of the OBU; and the sending module is further configured to send the identity information and the payment status.

According to a sixth aspect, this application further provides a server, including: a receiving module, configured to receive certificate request information, where the certificate request information includes identity information of a terminal device; a processing module, configured to determine permission of the terminal device based on the identity information; and a sending module, configured to send a communication key to the terminal device, where the sending module is further configured to send the communication key to a road side unit RSU according to a preset rule, and the communication key is used to encrypt information that is sent by the RSU externally.

In a possible design, the processing module is further configured to sign the certificate request information by using a CA server private key, to generate the communication certificate, where the certificate request information includes a first public key; and the sending module is further configured to send the communication certificate, where the communication certificate is used to establish a transmission channel between the terminal device and the CA server.

In a possible design, the processing module is further configured to encrypt the communication key by using the first public key.

In a possible design, the processing module is further configured to establish a secure transmission channel with the terminal device based on the communication certificate; and the sending module is further configured to send the communication key through the secure transmission channel.

In a possible design, the receiving module is further configured to receive encrypted certificate request information; and the processing module is further configured to decrypt the encrypted certificate request information.

In a possible design, the receiving module is specifically configured to: receive certificate request information encrypted by using a CA server public key; or receive certificate request information encrypted by using a symmetric key and the symmetric key encrypted by using a CA server public key.

In a possible design, the sending module is specifically configured to: send a second communication key according to the preset rule, where the communication key includes the second communication key, the second communication key is used to encrypt a first communication key, and the first communication key is used to encrypt broadcast information from the RSU.

In a possible design, the preset rule is a time rule.

In a possible design, the time rule is a preset fixed time period or a preset fixed time point.

In a possible design, the receiving module is further configured to re-receive the certificate request information according to the time rule within a validity period of the communication key, so as to update the communication key.

In a possible design, the sending module is specifically configured to: send a first communication key sequence, where the first communication key sequence includes a plurality of communication keys, total duration of validity periods of all communication keys in the first communication key sequence is greater than preset duration, and the preset duration is determined based on a parameter of a road section on which the RSU is located.

In a possible design, the receiving module is further configured to receive the identity information and a payment status, where if the payment status corresponds to a payment success state, the permission meets the preset permission requirement.

In a possible design, the processing module is further configured to determine the sent communication key based on a geographical area in which the RSU is located.

It may be understood that the terminal device provided in the fourth aspect is configured to perform any possible communication method provided in the first aspect. The road side unit provided in the fifth aspect is configured to perform any possible communication method provided in the second aspect. The server provided in the sixth aspect is configured to perform any possible communication method provided in the third aspect. Therefore, for beneficial effects that can be achieved by the terminal device, the road side unit, and the server, refer to beneficial effects in the corresponding method provided above. Details are not described herein again.

According to a seventh aspect, this application further provides a terminal device, including a processor and a memory. The memory is configured to store a program and data. The processor invokes the program stored in the memory, to perform any possible communication method provided in the first aspect.

According to an eighth aspect, this application further provides a road side unit, including a processor and a memory. The memory is configured to store a program and data. The processor invokes the program stored in the memory, to perform any possible communication method provided in the second aspect.

According to a ninth aspect, this application further provides a server, including a processor and a memory. The memory is configured to store a program and data. The processor invokes the program stored in the memory, to perform any possible communication method provided in the third aspect.

According to a tenth aspect, this application further provides a computer-readable storage medium. The computer-readable storage medium includes a program. When executed by a processor, the program is used to perform any possible communication method provided in the first aspect.

According to an eleventh aspect, this application further provides a computer-readable storage medium. The computer-readable storage medium includes a program. When executed by a processor, the program is used to perform any possible communication method provided in the second aspect.

According to a twelfth aspect, this application further provides a computer-readable storage medium. The computer-readable storage medium includes a program. When executed by a processor, the program is used to perform any possible communication method provided in the third aspect.

It may be understood that the terminal device provided in the seventh aspect and the computer-readable storage medium provided in the tenth aspect are configured to perform any possible communication method provided in the first aspect. The road side unit provided in the eighth aspect and the computer-readable storage medium provided in the eleventh aspect are configured to perform any possible communication method provided in the second aspect. The server provided in the ninth aspect and the computer-readable storage medium provided in the twelfth aspect are configured to perform any possible communication method provided in the third aspect. Therefore, for beneficial effects that can be achieved by the terminal device, the road side unit, the server, and the computer-readable storage medium, refer to beneficial effects in the corresponding method provided above. Details are not described herein again.

DESCRIPTION OF EMBODIMENTS

Figure 1:
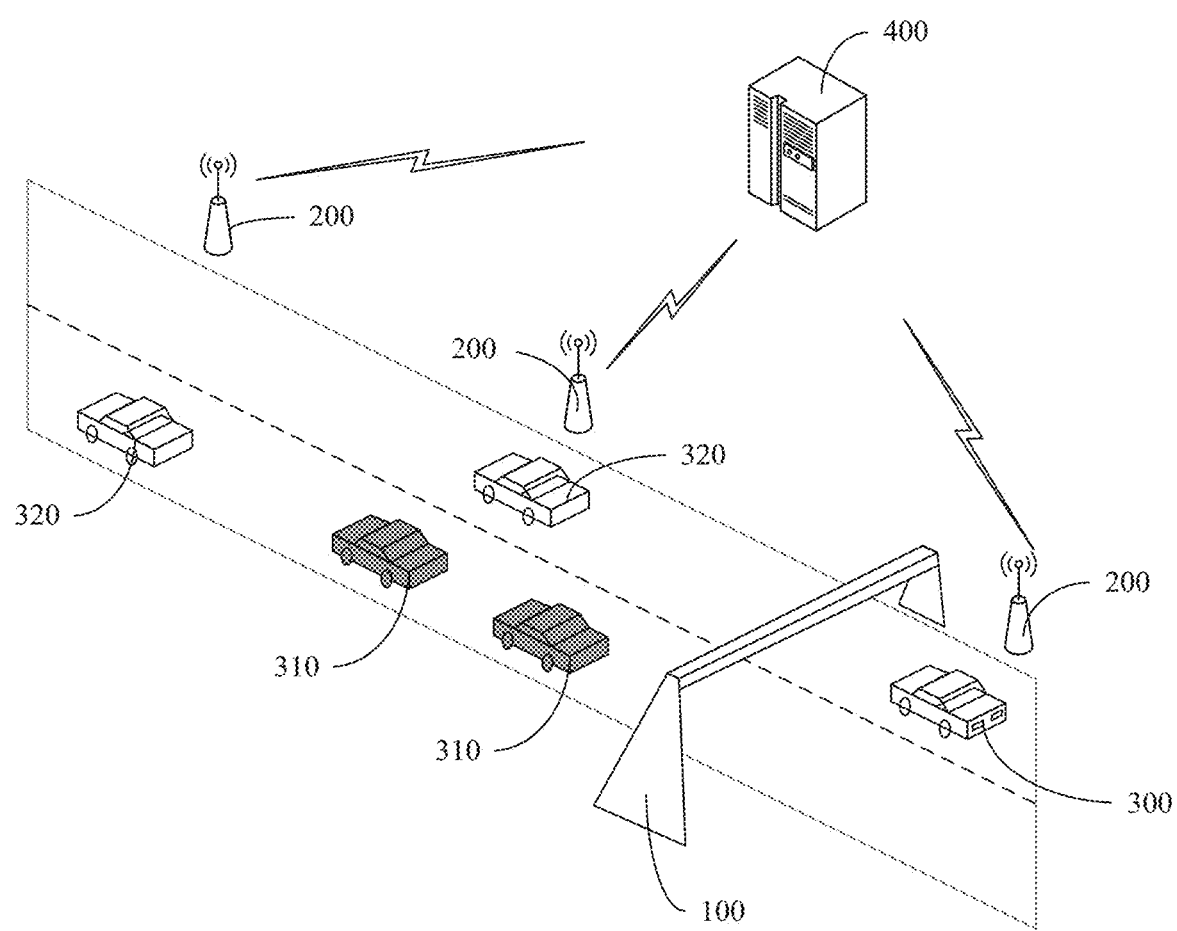
FIG. 1 is a schematic diagram of an application scenario of a communication method according to this application.
Figure 2:
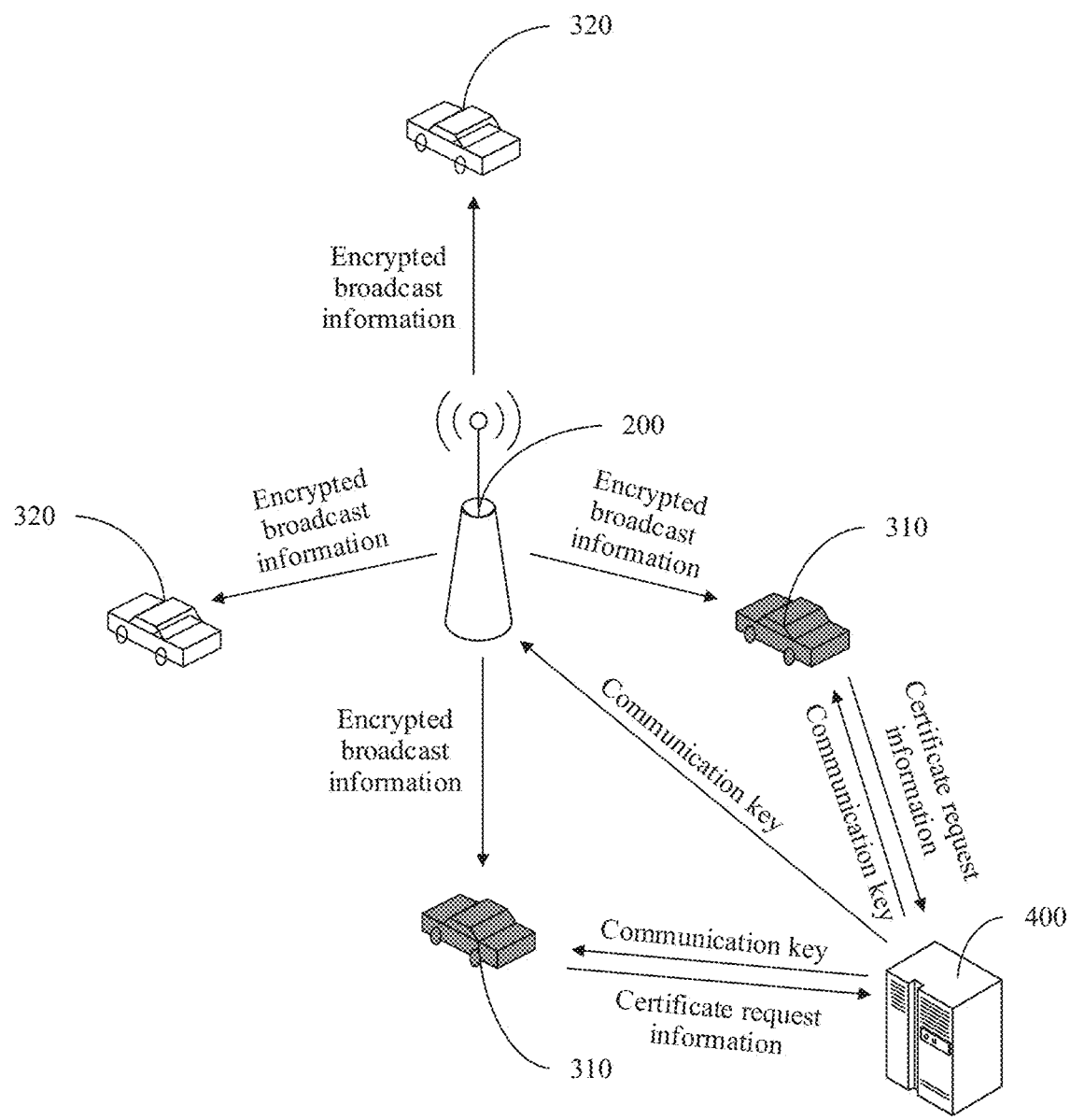
FIG. 2 is a schematic diagram of an information exchange relationship in a communication method according to this application.

FIG. 1 is a schematic diagram of an application scenario of a communication method according to this application. FIG. 2 is a schematic diagram of an information exchange relationship in a communication method according to this application. As shown in FIG. 1 and FIG. 2, the communication method provided in this embodiment is applied to a road traffic scenario, for example, may be applied to a highway scenario.

The following provides descriptions by using an example of a highway scenario. An ETC system 100 is usually disposed at an entrance or exit of a highway. An RSU 200 is usually deployed in the ETC system 100. When a vehicle passes through the ETC system 100, a terminal device on the vehicle is triggered to send certificate request information to a certificate authority (CA) server 400. The terminal device may be an OBU or UE. Descriptions are provided by using an example in which an OBU 300 may be selected to be used as the terminal device. The certificate request information includes identity information, and the identity information may be a character string used to identify the OBU 300. In addition, the certificate request information may be used to determine permission of the OBU 300.

The permission of the OBU 300 may be determined based on the identity information preset in the OBU 300. The permission of the OBU 300 may be used to represent a specific attribute, for example, a fee attribute, a region attribute, a vehicle brand attribute, a vehicle model attribute, and a vehicle ownership attribute.

Descriptions may be provided by using an example in which a fee attribute is selected to be as the specific attribute. When the vehicle passes through the ETC system 100 located at a preset node location of a road section, the ETC system 100 may obtain the identity information in the OBU 300. In addition, the ETC system 100 may further send a trigger instruction to the OBU 300, to trigger the OBU 300 to send the certificate request information to the CA server 400, where the certificate request information includes the identity information in the OBU 300. Alternatively, the ETC system 100 may further first send the identity information in the OBU 300 to a fee background server, and then the fee background server forwards the identity information to the CA server 400. Alternatively, the ETC system 100 sends the identity information to a fee background server only for storage. Alternatively, the RSU 200 sends the identity information to the CA server 400 after the OBU 300 has paid fees by using the ETC system 100. Alternatively, the RSU 200 first sends the identity information in the OBU 300 to a fee background server, and then the fee background server forwards the identity information to the CA server 400. Alternatively, the RSU 200 sends the identity information to a fee background server only for storage.

Optionally, when the vehicle has paid value-added fees in advance for obtaining value-added information in a form of purchasing a corresponding service, for example, the corresponding vehicle may specifically purchase a value-added service having duration of one day, one week, one month, or one year, or another duration range, the fee background server or the CA server 400 stores, in advance, information about a status that corresponds to the identity information in the OBU 300 and meets the permission. However, if the vehicle has not paid value-added fees in advance for obtaining value-added information, the fee background server or the CA server 400 stores, in advance, information about a status that corresponds to the identity information in the OBU 300 but does not meet the permission.

Alternatively, when the vehicle passes through the ETC system 100, if the vehicle has paid value-added fees for obtaining value-added information, the fee background server or the CA server 400 modifies information about a status corresponding to the identity information in the OBU 300 to a status that meets the permission. However, when the vehicle passes through the ETC system 100, if the vehicle has not paid value-added fees for obtaining value-added information, the fee background server or the CA server 400 modifies information about a status corresponding to the identity information in the OBU 300 to a status that does not meet the permission.

After the CA server 400 receives the certificate request information sent by the OBU 300, the CA server 400 may directly obtain the permission of the OBU 300 from the CA server 400, or obtain the permission of the OBU 300 from the fee background server, and then determine, based on the obtained permission, whether to deliver a communication key to the OBU 300. The OBU 300 may decrypt received encrypted broadcast information by using the communication key. It should be noted that pushed information may be directly obtained after the encrypted broadcast information is decrypted by using the communication key; pushed information may be obtained through decryption by using another communication key after the another communication key and information encrypted by using the another communication key are obtained; or pushed information may be obtained through decryption by using another communication key after the another communication key or information encrypted by using the communication key are obtained.

In addition, the CA server 400 may further deliver a communication key to the RSU 200. It should be noted that behavior in which the CA server 400 delivers the communication key to the RSU 200 is not affected by an exchange relationship between the CA server 400 and the OBU 300. For example, the CA server 400 may deliver the communication key to the OBU 300 according to a preset rule. Optionally, the CA server 400 may deliver the communication key to the OBU 300 according to a time rule, for example, in a preset fixed time period or at a preset fixed time point. Then, the OBU 300 may encrypt, by using the received communication key, broadcast information that is sent externally. It should be noted that the broadcast information that is sent by the OBU 300 externally may be information obtained by separately encrypting the pushed information by using the communication key, may be information obtained by encrypting the pushed information and another communication key together by using the communication key, or may be information obtained by separately encrypting another communication key by using the communication key.

It should be noted that, the communication key used for decryption in the OBU 300 needs to be ensured to be the same as or paired with the communication key used for encryption in the OBU 300 at a same moment, so that the OBU 300 can decrypt, by using the received communication key, the encrypted broadcast information broadcast by the OBU 300. Specifically, the foregoing preset rule may be used for implementation. However, a form of the preset rule is not specifically limited in this embodiment, as long as the communication key used for decryption in the OBU 300 is ensured to be the same as or paired with the communication key used for encryption in the OBU 300 according to the uniform preset rule.

After the vehicles enter the highway, because the CA server 400 has sent the communication key to an OBU 310 whose permission meets the preset permission requirement, the OBU 310 whose permission meets the preset permission requirement can decrypt the received encrypted broadcast information and obtain the corresponding pushed information, but an OBU 320 whose permission does not meet the preset permission requirement does not have the communication key and cannot decrypt the received encrypted broadcast information. This implements an effect that only a vehicle having a specific attribute can receive related pushed information.

Figure 3:
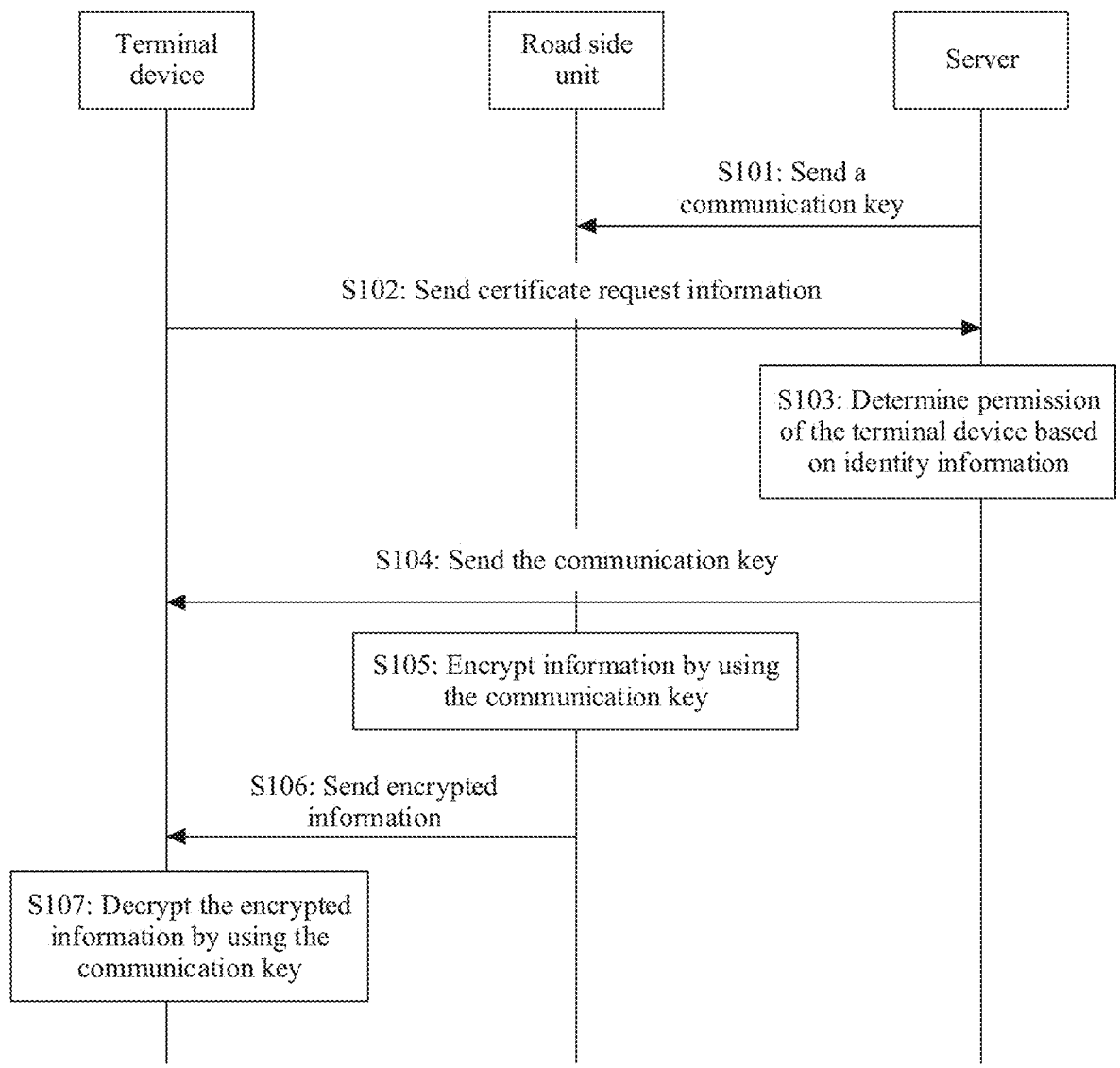
FIG. 3 is a flowchart of an example of a communication method according to an embodiment of this application.

FIG. 3 is a flowchart of an example of a communication method according to an embodiment of this application. As shown in FIG. 3, the communication method provided in this embodiment includes the following steps.

S101: Send a communication key.

A CA server may send the communication key to a road side unit RSU according to a preset rule, where the communication key may be used to encrypt information that is sent by the RSU externally.

Optionally, the CA server may send the communication key to the RSU according to a preset time rule. For example, the CA server may send the communication key to the RSU based on a preset fixed time period or a preset fixed time point.

Descriptions may be provided by using an example in which the CA server periodically sends the communication key to the RSU. The preset fixed time period may be in a unit of an hour, a minute, or even a day. This is not specifically limited in this embodiment.

In addition, the CA server may further deliver the same communication key or different communication keys to all RSUs in each period. Alternatively, the CA server may deliver a corresponding communication key based on a geographical area in which an RSU is located. For example, the CA server delivers a communication key X to an RSU located on a Beijing-Shanghai highway, and delivers a communication key Y to an RSU located on a Shanghai-Shaanxi highway, so that communication keys in different area ranges are not universally used. This facilitates separate tariff management for all areas.

In addition, the RSU may further maintain a plurality of communication keys at the same time. The RSU may receive a second communication key sequence sent by the CA server, where the second communication key sequence includes a plurality of communication keys; and then sequentially select, according to a time rule, a communication key in the second communication key sequence as a communication key for encrypting information. For example, the RSU may maintain two communication keys at the same time, and the two communication keys are a currently used communication key and a communication key to be used in a next time period. After receiving the communication key delivered by the CA server, the RSU may immediately update the currently used communication key, or may update the currently used communication key after a specific time period or at a specific time point. The specific time period or the specific time point may be synchronized to the CA server according to the preset rule.

S102: Send certificate request information.

An ETC system 100 is usually disposed at an entrance or exit of a highway. An RSU is usually deployed in the ETC system. When a vehicle passes through the ETC system, the RSU sends a trigger instruction to an OBU, so as to trigger a terminal device (for example, an OBU or UE) on the vehicle to send the certificate request information to the CA server. It should be noted that in the following steps, descriptions are provided by using an example in which an OBU is selected as the terminal device.

The certificate request information includes identity information, and the identity information may be a character string used to identify the OBU. In addition, the certificate request information may be used to determine permission of the OBU. It should be noted that, when the vehicle passes through the ETC system, the OBU may trigger behavior of sending the certificate request information to the CA server, or after determining that the OBU has the corresponding permission, for example, when the vehicle passes through the ETC system, if the vehicle has paid value-added fees for obtaining value-added information, the OBU may trigger behavior of sending the certificate request information to the CA server.

S103: Determine permission of the terminal device based on the identity information.

Specifically, the permission of the OBU may be determined based on the identity information preset in the OBU, where the permission of the OBU may be used to represent a specific attribute, for example, fee information. When the vehicle passes through the ETC system, the ETC system may obtain the identity information in the OBU. Then, the ETC system sends the identity information in the OBU to the CA server. Alternatively, the ETC system may first send the identity information in the OBU to a fee background server, and then the fee background server forwards the identity information to the CA server. Alternatively, the ETC system sends the identity information to a fee background server only for storage. Alternatively, the RSU sends the identity information to the CA server after the OBU has paid fees by using the ETC system. Alternatively, the RSU first sends the identity information in the OBU to a fee background server, and then the fee background server forwards the identity information to the CA server. Alternatively, the RSU sends the identity information to a fee background server only for storage.

Optionally, when the vehicle has paid value-added fees in advance for obtaining value-added information in a form of purchasing a corresponding service, for example, the corresponding vehicle purchases a value-added service having duration of one day, one week, one month, or one year, or another duration range, the fee background server or the CA server stores, in advance, information about a status that corresponds to the identity information in the OBU and meets the permission. However, if the vehicle has not paid value-added fees in advance for obtaining value-added information, the fee background server or the CA server stores, in advance, information about a status that corresponds to the identity information in the OBU but does not meet the permission.

Alternatively, before the OBU sends the certificate request information to the CA server, the OBU may send the identity information and a payment status in the OBU, to determine the permission of the OBU. If the payment status corresponds to a payment success state, the permission meets a preset permission requirement. The OBU may directly send the identity information and the payment status to the CA server.

For example, when the vehicle passes through the ETC system, if the vehicle has paid value-added fees for obtaining value-added information, the fee background server or the CA server modifies information about a status corresponding to the identity information in the OBU to a status that meets the permission. However, when the vehicle passes through the ETC system, if the vehicle has not paid value-added fees for obtaining value-added information, the fee background server or the CA server modifies information about a status corresponding to the identity information in the OBU to a status that does not meet the permission.

S104: Send the communication key.

After the CA server receives the certificate request information sent by the OBU, the CA server may directly obtain the permission of the OBU, or obtain the permission of the OBU from the fee background server, and then determine, based on the obtained permission, whether to deliver the communication key to the OBU. The OBU may decrypt received encrypted broadcast information by using the communication key. It should be noted that pushed information may be directly obtained after the encrypted broadcast information is decrypted by using the communication key; pushed information may be obtained through decryption by using another communication key after the another communication key and information encrypted by using the another communication key are obtained; or pushed information may be obtained through decryption by using another communication key after the another communication key or information encrypted by using the communication key are obtained.

In addition, the CA server may encrypt the communication key when subsequently delivering the communication key, to ensure security of the communication key during delivering from the CA server to the OBU. The encryption may be performed in a symmetric encryption manner or in an asymmetric encryption manner. A specific encryption manner is not limited in this embodiment.

Optionally, before sending the certificate request information to the CA server, the OBU may further generate a first key pair, where the first key pair includes a first private key and a first public key. Then, the OBU includes the first public key in the certificate request information, and sends the certificate request information including the first public key to the CA server.

Correspondingly, after the CA server receives the certificate request information including the first public key, the CA server may encrypt the communication key by using the first public key received from the OBU, and then deliver an encrypted communication key to the OBU, so that the OBU decrypts the encrypted communication key by using the first private key and obtains the communication key.

In another possible implementation, the CA server may further sign the certificate request information by using a preset CA private key, to generate a communication certificate. The CA server first delivers the generated communication certificate to the OBU. Then, the OBU may verify the communication certificate by using a CA public key, establish a secure transmission channel with the CA server based on the received communication certificate, and send the communication key through the secure transmission channel.

The OBU may further encrypt the certificate request information before sending the certificate request information, to ensure security of the communication key during delivering from the CA server to the OBU, and to improve security of the certificate request information sent by the OBU to the CA server. The sent certificate request information is encrypted certificate request information. The encryption may be performed in a symmetric encryption manner or in an asymmetric encryption manner. A specific encryption manner is not limited in this embodiment.

In a possible encryption manner, the certificate request information may be encrypted by using a preset CA public key, so that the CA server may decrypt the certificate request information by using a CA private key after receiving the encrypted certificate request information.

The asymmetric encryption manner for which a public-private key pair is used for encryption and decryption has a large data processing amount and a slow processing speed, while the symmetric key manner used for encryption and decryption has a small data processing amount and a fast processing speed compared with the asymmetric encryption manner. Therefore, when there is a large amount of certificate request information data, before the OBU sends the certificate request information, the OBU may further generate a symmetric key, encrypt the certificate request information by using the symmetric key, and encrypt the symmetric key by using a preset CA public key, to ensure security of the certificate request information sent by the OBU to the CA server, and further improve efficiency of encrypting the certificate request information by the OBU and decrypting the certificate request information by the CA server. The encrypted certificate request information includes an encrypted symmetric key.

S105: Encrypt information by using the communication key.

S106: Send encrypted information.

After receiving the communication key sent by the CA server, the RSU may encrypt, by using the communication key, the information that is sent by the RSU externally. Optionally, the encrypted information may be encrypted broadcast information. The encrypted broadcast information includes a broadcast identifier. After receiving the information, the OBU may determine, by identifying the broadcast identifier, that the information is the broadcast information.

Optionally, when the communication key needs to be dynamically updated, a communication key currently used for encrypting information may be first determined according to the preset rule before the encrypted broadcast information is sent, to ensure that the communication key used for decryption in the OBU is the same as or paired with the communication key used for encryption in the RSU.

Specifically, the communication key used for decryption in the OBU needs to be ensured to be the same as or paired with the communication key used for encryption in the RSU at a same moment, so that the OBU can decrypt, by using the received communication key, the encrypted broadcast information broadcast by the RSU. This can be implemented by using the preset rule, for example, a time rule, agreed upon with the CA server. However, a form of the preset rule is not specifically limited in this embodiment, as long as the communication key used for decryption in the OBU is ensured to be the same as or paired with the communication key used for encryption in the OBU according to the uniform preset rule.

In addition, when encrypting, by using the communication key, the information that is sent by the RSU externally, the RSU may further determine whether the information that is currently sent externally meets a preset service type requirement. For example, if a type of the information that is currently sent externally is a service type of a non-value-added service, the RSU does not need to encrypt the information, so that all vehicles that receive information can obtain the related information. However, if a type of the information that is currently sent externally is a service type of a value-added service, the RSU encrypts, by using the communication key, the information that is sent by the RSU externally, so that only a vehicle that has purchased the value-added service can decrypt the information and obtain the related information.

S107: Decrypt the encrypted broadcast information by using the communication key.

After vehicles enter the highway, because the CA server has sent the communication key to an OBU whose permission meets the preset permission requirement, the OBU whose permission meets the preset permission requirement can decrypt the received encrypted broadcast information and obtain corresponding pushed information, but an OBU whose permission does not meet the preset permission requirement does not have the communication key and cannot decrypt the received encrypted broadcast information. It should be noted that the preset permission requirement may be set according to a specific requirement. For example, the preset permission requirement may be set as a fee requirement, a region requirement, a vehicle brand requirement, a vehicle model requirement, or a vehicle ownership requirement. A specific form of the preset permission requirement is not limited in this embodiment.

In this embodiment, the CA server determines the permission of the terminal device based on the identity information in the certificate request sent by the terminal device, and delivers the communication key to the terminal device when the permission of the terminal device meets the preset permission requirement, so that only the terminal device that meets the preset permission requirement can decrypt, by using the communication key, the encrypted information sent by the RSU. The RSU encrypts, by using the communication key sent by the CA server, the information that is sent externally, so that only a vehicle that meets a specific attribute requirement can decrypt the received information, and receive the related pushed information. This implements an objective of providing differentiated services for vehicles having different features.

Figure 4:
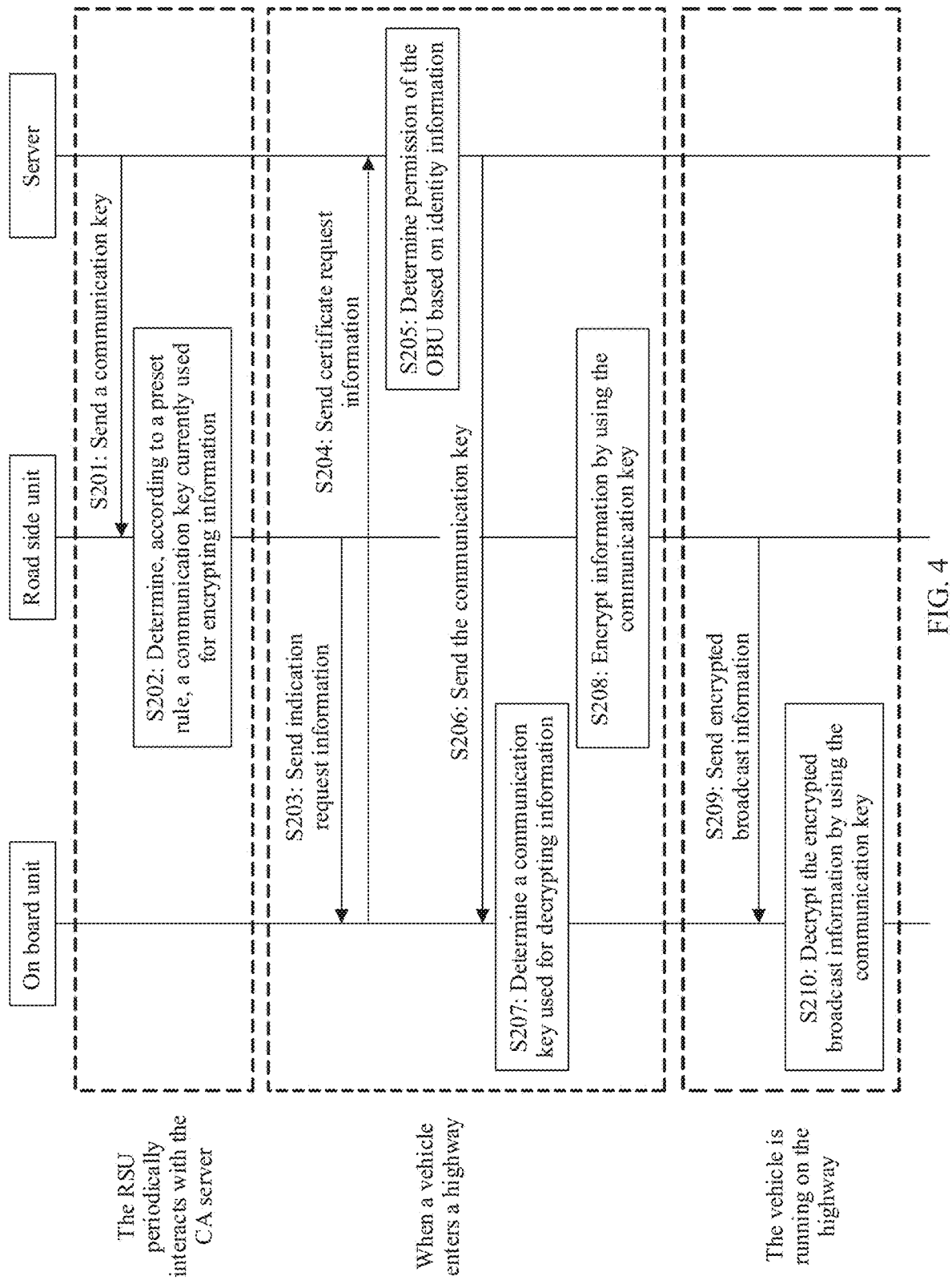
FIG. 4 is a flowchart of another example of a communication method according to an embodiment of this application.

FIG. 4 is a flowchart of another example of a communication method according to an embodiment of this application. As shown in FIG. 4, the communication method provided in this embodiment includes the following steps.

S201: Send a communication key.

Specifically, a CA server may periodically interact with an RSU. Descriptions may be provided by using an example in which the CA server periodically sends the communication key to the RSU. For example, the period duration may be in a unit of an hour, a minute, or even a day. In this embodiment, the communication key periodically delivered by the CA server to the RSU may be a Kc, where the Kc is a key used by the RSU to encrypt broadcast information.

In addition, the CA server may further deliver the same Kc or deliver different Kcs to all RSUs in each period. Alternatively, the CA server may deliver a corresponding Kc based on a geographic area in which an RSU is located.

S202: Determine, according to a preset rule, a communication key currently used for encrypting information.

The RSU may further maintain a plurality of Kcs at the same time. The RSU may receive a second communication key sequence sent by the CA server, where the second communication key sequence includes a plurality of Kcs; and then sequentially select, according to a time rule, a Kc in the second communication key sequence as a communication key for encrypting information. For example, the RSU may maintain two Kcs at the same time, and the two Kcs are a currently used Kc and a Kc to be used in a next time period. After receiving the Kc delivered by the CA server, the RSU may immediately update the currently used Kc, or may update the currently used Kc after a specific time period or at a specific time point. The specific time period or the specific time point may be synchronized to the CA server according to the preset rule.

S203: Send indication request information.

When a vehicle enters a highway, to trigger the vehicle to send the indication request information to the CA server, the RSU may send the indication request information to the vehicle when the RSU located at an entrance or exit senses that the vehicle is to enter the highway. The indication request information is used to indicate a terminal device to send the certificate request information. It should be noted that, when the vehicle is at the entrance or exit, ETC payment usually needs to be performed to trigger the corresponding RSU to send the indication request information to the OBU.

S204: Send the certificate request information.

In this step, the certificate request information includes identity information, and the identity information may be a character string used to identify the OBU. In addition, the certificate request information may be used to determine permission of the OBU. It should be noted that, when the vehicle passes through an ETC system, the OBU may trigger behavior of sending the certificate request information to the CA server, or after determining that the OBU has the corresponding permission, for example, when the vehicle passes through the ETC system, if the vehicle has paid value-added fees for obtaining value-added information, the OBU may trigger behavior of sending the certificate request information to the CA server.

Before sending the certificate request information to the CA server, the OBU may further generate a first key pair, where the first key pair includes a first private key and a first public key. Then, the OBU includes the first public key in the certificate request information, and sends the certificate request information including the first public key to the CA server.

Correspondingly, after the CA server receives the certificate request information including the first public key, the CA server may encrypt the Kc by using the first public key received from the OBU, and then deliver an encrypted Kc to the OBU, so that the OBU decrypts the encrypted Kc by using the first private key, and the OBU obtains the Kc.

In addition, in another possible encryption manner, an asymmetric encryption manner for which a public-private key pair is used for encryption and decryption has a large data processing amount and a slow processing speed, while a symmetric key manner used for encryption and decryption has a small data processing amount and a fast processing speed compared with the asymmetric encryption manner. Therefore, w % ben there is a large amount of certificate request information data, before the OBU sends the certificate request information, the OBU may further generate a symmetric key, encrypt the certificate request information by using the symmetric key, and encrypt the symmetric key by using a preset CA public key, to ensure security of the certificate request information sent by the OBU to the CA server, and further improve efficiency of encrypting the certificate request information by the OBU and decrypting the certificate request information by the CA server. The encrypted certificate request information includes an encrypted symmetric key.

S205: Determine the permission of the OBU based on the identity information.

Specifically, the permission of the OBU may be determined based on the identity information preset in the OBU, where the permission of the OBU may be used to represent a specific attribute, for example, fee information. When the vehicle passes through the ETC system, the ETC system may obtain the identity information in the OBU. Then, the ETC system sends the identity information in the OBU to the CA server. Alternatively, the ETC system may first send the identity information in the OBU to a fee background server, and then the fee background server forwards the identity information to the CA server. Alternatively, the ETC system sends the identity information to a fee background server only for storage. Alternatively, the RSU sends the identity information to the CA server after the OBU has paid fees by using the ETC system. Alternatively, the RSU first sends the identity information in the OBU to a fee background server, and then the fee background server forwards the identity information to the CA server. Alternatively, the RSU sends the identity information to a fee background server only for storage.

Optionally, when the vehicle has paid value-added fees in advance for obtaining value-added information in a form of purchasing a corresponding service, for example, the corresponding vehicle purchases a value-added service having duration of one day, one week, one month, or one year, or another duration range, the fee background server or the CA server stores, in advance, information about a status that corresponds to the identity information in the OBU and meets the permission. However, if the vehicle has not paid value-added fees in advance for obtaining value-added information, the fee background server or the CA server stores, in advance, information about a status that corresponds to the identity information in the OBU but does not meet the permission.

Alternatively, before the OBU sends the certificate request information to the CA server, the OBU may send the identity information and a payment status in the OBU, to determine the permission of the OBU. If the payment status corresponds to a payment success state, the permission meets a preset permission requirement. The OBU may directly send the identity information and the payment status to the CA server.

For example, when the vehicle passes through the ETC system, if the vehicle has paid value-added fees for obtaining value-added information, the fee background server or the CA server modifies information about a status corresponding to the identity information in the OBU to a status that meets the permission. However, when the vehicle passes through the ETC system, if the vehicle has not paid value-added fees for obtaining value-added information, the fee background server or the CA server modifies information about a status corresponding to the identity information in the OBU to a status that does not meet the permission.

S206: Send the communication key.

After the CA server receives the certificate request information sent by the OBU, the CA server may directly obtain the permission of the OBU, or obtain the permission of the OBU from the fee background server, and then determine, based on the obtained permission, whether to deliver the communication key to the OBU.

Then, an encrypted Kc is decrypted by using the first private key, so that the OBU can decrypt the received encrypted broadcast information by using the Kc.

Alternatively, after receiving the certificate request information that is sent by the OBU and that includes the first public key, the CA server may further sign the certificate request information by using a CA private key, to generate a communication certificate. The CA server first delivers the generated communication certificate to the OBU. Then, the OBU may verify the communication certificate by using a CA public key, establish a secure transmission channel with the CA server based on the received communication certificate, and send the Kc through the secure transmission channel, so that the OBU can decrypt the received encrypted broadcast information by using the Kc.

S207: Determine a communication key used for decrypting information.

The Kc used for decryption in the OBU needs to be ensured to be the same as or paired with the Kc used for encryption in the RSU at a same moment, so that the OBU can decrypt, by using the received Kc, the encrypted broadcast information broadcast by the RSU. This can be implemented by using the preset rule, for example, a time rule, agreed upon with the CA server. For example, the Kc may be updated based on a fixed period; or a fixed use period may be set for each Kc, so that a Kc that is being used by the OBU is the same as or corresponds to a Kc that is being used by the RSU at each time point.

S208: Encrypt information by using the communication key.

S209: Send encrypted broadcast information.

After receiving the Kc sent by the CA server, the RSU may encrypt, by using the Kc, the broadcast information that is sent by the RSU externally.

S210: Decrypt the encrypted broadcast information by using the communication key.

After vehicles enter the highway and are running on the highway, because the CA server has sent the Kc to an OBU that purchases the value-added service, the OBU that purchases the value-added service can decrypt the received encrypted broadcast information and obtain corresponding pushed information, but an OBU that does not purchase the value-added service does not have the Kc and cannot decrypt the received encrypted broadcast information.

Optionally, the OBU may perform processing according to an encryption and signature sequence after receiving the encrypted broadcast information, to obtain the pushed information. The encryption and signature sequence for the broadcast information may be preset. Specifically, if the encrypted broadcast information is first encrypted and then signed, the OBU verifies the encrypted broadcast information by using a preset RSU public key. If the verification succeeds, the OBU performs decryption by using the Kc. However, if the encrypted broadcast information is first signed and then encrypted, the OBU first performs decryption by using the Kc, and then verifies the decrypted broadcast information by using a preset RSU public key.

In addition, after sending the certificate request information, the OBU may re-send the certificate request information according to the time rule within a validity period of the communication key, to update the Kc used for decrypting information. Therefore, information service interruption caused by Kc update does not occur in a running process of the vehicle.

Alternatively, before updating the Kc, the RSU encrypts, by using the currently used Kc, a Kc to be used in a next time period, and broadcasts an encrypted Kc, so that the OBU can obtain the Kc to be used in the next time period.

In addition to frequently updating the Kc, the CA server may further directly deliver a first communication key sequence. The first communication key sequence includes a plurality of Kcs, and total duration of validity periods of all Kcs in the first communication key sequence is greater than preset duration. It should be understood that each Kc in the first communication key sequence corresponds to a fixed valid time period. The CA server records information about each time period, and the CA server may deliver the Kc to the RSU based on the valid time period of each Kc, so that the RSU can determine the Kc currently used for encryption based on the valid time period of each Kc. In addition, the preset duration may be determined based on a maximum time period in which the vehicle normally runs on each road section.

In this embodiment, the CA server decrypts the received encrypted certificate request information sent by the OBU, determines the permission of the terminal device based on the identity information in the certificate request, and delivers the encrypted communication key to the terminal device when the permission of the terminal device meets the preset permission requirement, so that the OBU decrypts the encrypted communication key to obtain the communication key. This ensures security during transmission of the communication key, and ensures that only the terminal device that meets the preset permission requirement can decrypt, by using the communication key, the encrypted broadcast information that is sent by the RSU. The RSU encrypts, by using the communication key sent by the CA server, the information that is sent externally, so that only a vehicle that meets a specific attribute requirement can decrypt the received information, and receive related pushed information. This implements an objective of providing differentiated services for vehicles having different features.

Figure 5:
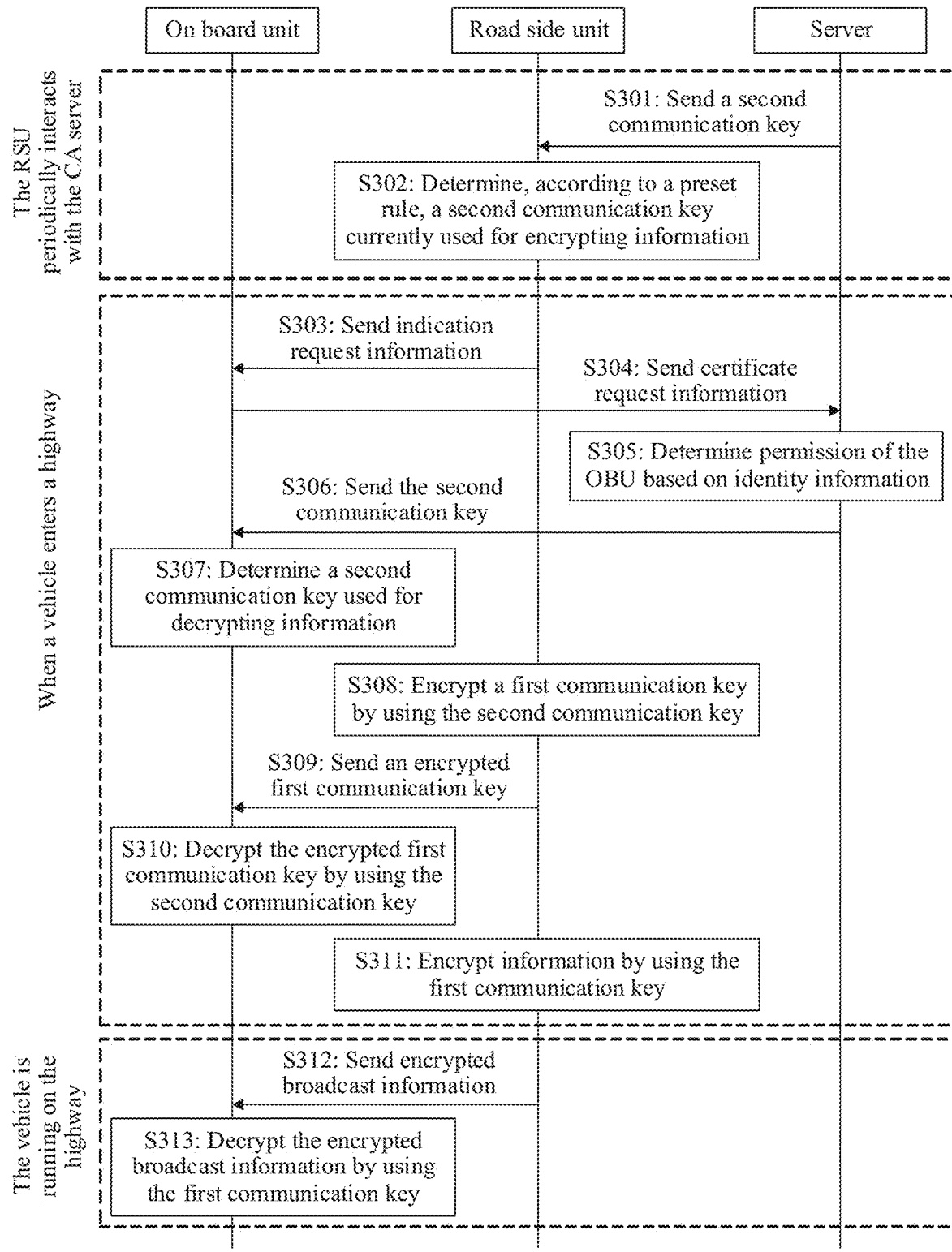
FIG. 5 is a flowchart of still another example of a communication method according to an embodiment of this application.

FIG. 5 is a flowchart of still another example of a communication method according to an embodiment of this application. As shown in FIG. 5, the communication method provided in this embodiment includes the following steps.

S301: Send a second communication key.

Specifically, a CA server may periodically interact with an RSU. Descriptions are provided by using an example in which the CA server may periodically send the second communication key Ke to the RSU. For example, the period duration may be in a unit of an hour, a minute, or even a day. In this embodiment, the second communication key periodically delivered by the CA server to the RSU may be the Ke. It should be understood that the RSU may use the Ke for a first communication key Kc. The Kc is a key used by the RSU to encrypt broadcast information.

In addition, the CA server may further deliver the same Ke or deliver different Kes to all RSUs in each period. Alternatively, the CA server may deliver a corresponding Ke based on a geographic area in which an RSU is located.

S302: Determine, according to a preset rule, a second communication key currently used for encrypting information.

The RSU may further maintain a plurality of Kes at the same time. The RSU may receive a second communication key sequence sent by the CA server, where the second communication key sequence includes a plurality of Kes; and then sequentially select, according to a time rule, a Ke in the second communication key sequence as a communication key for encrypting information. For example, the RSU may maintain two Kes at the same time, and the two Kes are a currently used Ke and a Ke to be used in a next time period. After receiving the Ke delivered by the CA server, the RSU may immediately update the currently used Ke, or may update the currently used Ke after a specific time period or at a specific time point. The specific time period or the specific time point may be synchronized to the CA server according to the preset rule.

S303: Send indication request information.

S304: Send certificate request information.

S305: Determine permission of the OBU based on identity information.

It should be noted that implementations of S303 to S305 in this embodiment are similar to implementations of S203 to S205 in the embodiment shown in FIG. 4, and details are not described herein again.

S306: Send the second communication key.

After the CA server receives the certificate request information sent by the OBU, the CA server may directly obtain the permission of the OBU, or obtain the permission of the OBU from a fee background server, and then determine, based on the obtained permission, whether to deliver the Ke to the OBU.

Then, an encrypted Ke is decrypted by using a first private key, so that the OBU can decrypt the received encrypted broadcast information by using the Ke.

Alternatively, after receiving the certificate request information that is sent by the OBU and that includes the first public key, the CA server may further sign the certificate request information by using a CA private key, to generate a communication certificate. The CA server first delivers the generated communication certificate to the OBU. Then, the OBU may verify the communication certificate by using a CA public key, establish a secure transmission channel with the CA server based on the received communication certificate, and send the Ke through the secure transmission channel, so that the OBU can decrypt the received encrypted Kc by using the Ke to obtain a Kc, and decrypt encrypted broadcast information by using the Kc.

S307: Determine a second communication key used for decrypting information.

The Ke used for decryption in the OBU needs to be ensured to be the same as or paired with the Ke used for encryption in the RSU at a same moment, so that the OBU can decrypt, by using the received Ke, the encrypted Kc that is broadcast by the RSU. This can be implemented by using the preset rule, for example, a time rule, agreed upon with the CA server. For example, the Ke may be updated based on a fixed period; or a fixed use period may be set for each Ke, so that a Ke that is being used by the OBU is the same as or corresponds to a Ke that is being used by the RSU at each time point.

S308: Encrypt a first communication key by using the second communication key.

S309: Send an encrypted first communication key.

After receiving the Ke sent by the CA server, the RSU may encrypt the Kc by using the Ke, and then broadcast and send the encrypted Kc. It should be noted that the encrypted Kc may be separately broadcast and sent, or may be sent together when other information is broadcast.

S310: Decrypt the encrypted first communication key by using the second communication key.

After vehicles enter a highway and are running on the highway, because the CA server has sent the Ke to an OBU that purchases a value-added service, the OBU that purchases the value-added service may decrypt the received encrypted Kc and obtain the Kc, and an OBU that does not purchase the value-added service cannot perform decryption and cannot obtain the Kc.

Optionally, the OBU may perform processing according to an encryption and signature sequence after receiving the encrypted Kc, to obtain the Kc. The encryption and signature sequence for the Kc may be preset. Specifically, if the encrypted Kc is first encrypted and then signed, the OBU verifies the encrypted Kc by using a preset RSU public key. If the verification succeeds, the OBU performs decryption by using the Kc. However, if the encrypted Kc is first signed and then encrypted, the OBU first performs decryption by using the encrypted Kc, and then verifies the decrypted Kc by using a preset RSU public key.

S311: Encrypt information by using the first communication key.

S312: Send encrypted broadcast information.

The RSU can use the Kc to encrypt the information broadcast and sent by the RSU externally, so that the Kc is completely managed by the RSU. When the RSU needs to update the Kc, the RSU may re-broadcast an encrypted Kc.

S313: Decrypt the encrypted broadcast information by using the first communication key.

Because the CA server has sent the Ke to the OBU that purchases the value-added service, the OBU that purchases the value-added service can decrypt the received encrypted Kc to obtain the Kc, and further decrypt the encrypted broadcast information by using the Kc, to obtain corresponding pushed value-added information.

In addition, after sending the certificate request information, the OBU may re-send the certificate request information according to the time rule within a validity period of the communication key, to update the Ke used for decrypting information. Therefore, information service interruption caused by Ke update does not occur in a running process of the vehicle.

Alternatively, before updating the Kc, the RSU encrypts, by using the currently used Ke, a Ke to be used in a next time period, and broadcasts an encrypted Ke, so that the OBU can obtain the Ke to be used in the next time period.

In addition to frequently updating the Ke, the CA server may further directly deliver a first communication key sequence. The first communication key sequence includes a plurality of Kes, and total duration of validity periods of all Kes in the first communication key sequence is greater than preset duration. It should be understood that each Ke in the first communication key sequence corresponds to a fixed valid time period. The CA server records information about each time period, and the CA server may deliver the Ke to the RSU based on the valid time period of each Ke, so that the RSU can determine a Ke currently used for encryption based on the valid time period of each Ke. In addition, the preset duration may be determined based on a maximum time period in which the vehicle normally runs on each road section.

In this embodiment, the CA server decrypts the received encrypted certificate request information sent by the OBU, determines the permission of the terminal device based on the identity information in the certificate request, and delivers the encrypted second communication key to the terminal device when the permission of the terminal device meets the preset permission requirement, so that the OBU decrypts the encrypted second communication key to obtain the second communication key. This ensures security during transmission of the second communication key, and ensures that only the terminal device that meets the preset permission requirement can decrypt, by using the second communication key, the first communication key sent by the RSU, and decrypt the encrypted broadcast information by using the first communication key. The RSU encrypts, by using the first communication key sent by the CA server, the information that is sent externally, so that only a vehicle that meets a specific attribute requirement can decrypt the received information, and receive the related pushed information. This implements an objective of providing differentiated services for vehicles having different features.

Figure 6:
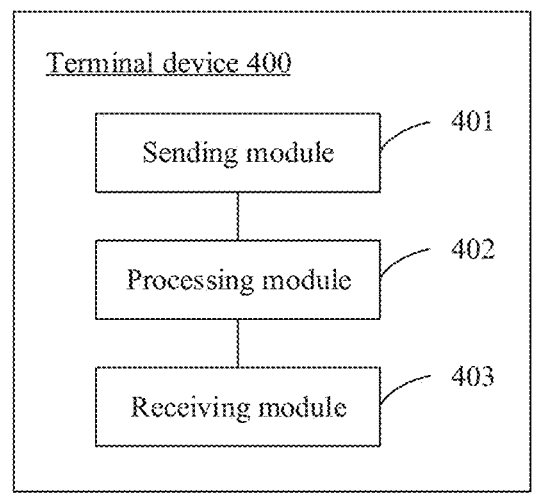
FIG. 6 is a diagram of an example of a structure of a terminal device according to an embodiment of this application.

FIG. 6 is a diagram of an example of a structure of a terminal device according to an embodiment of this application. As shown in FIG. 6, the terminal device 400 provided in this embodiment includes:

a receiving module 403, configured to receive a trigger instruction at a preset node location of a road section;

a sending module 401, configured to send certificate request information, where the certificate request information includes identity information of the terminal device, where the receiving module 403 is configured to receive a communication key sent by a certificate authority CA server; and the receiving module 403 is further configured to receive encrypted information sent by a road side unit RSU, where the encrypted information is information encrypted by using the communication key; and a processing module 402, configured to decrypt the encrypted information by using the communication key.

In a possible design, the encrypted information is encrypted broadcast information, and the encrypted broadcast information includes a broadcast identifier.

In a possible design, the processing module 402 is further configured to generate a first key pair, where the first key pair includes a first private key and a first public key, and the certificate request information includes the first public key.

In a possible design, the first public key is used to encrypt the communication key.

In a possible design, the receiving module 403 is specifically configured to:

receive a communication certificate sent by the CA server;

establish a secure transmission channel between the terminal device and the CA server based on the communication certificate; and receive, through the secure transmission channel, the communication key sent by the CA server.

In a possible design, the processing module 402 is further configured to encrypt the certificate request information, and the sent certificate request information is encrypted certificate request information.

In a possible design, the processing module 402 is specifically configured to:

encrypt the certificate request information by using a preset CA server public key; or generate a symmetric key, and encrypt the certificate request information by using the symmetric key; and encrypt the symmetric key by using a preset CA server public key, and send an encrypted symmetric key.

In a possible design, the processing module 402 is further configured to determine, according to a preset rule, a communication key currently used for decrypting information.

In a possible design, the processing module 402 is specifically configured to:

receive an encrypted first communication key sent by the RSU;

receive, according to the preset rule, a second communication key sent by the CA server; and decrypt the encrypted first communication key by using the second communication key.

In a possible design, the preset rule is a time rule.

In a possible design, the time rule is a preset fixed time period or a preset fixed time point.

In a possible design, the sending module 401 is further configured to re-send the certificate request information according to the time rule within a validity period of the communication key, so as to update the communication key used for decrypting information.

In a possible design, the processing module 402 is specifically configured to:

receive a first communication key sequence, where the first communication key sequence includes a plurality of communication keys, and total duration of validity periods of all communication keys in the first communication key sequence is greater than preset duration; and determine, according to the time rule, one communication key in the first communication key sequence as the communication key currently used for decrypting information.

In a possible design, the processing module 402 is further configured to verify the encrypted broadcast information by using a preset RSU public key.

In a possible design, the processing module 402 is further configured to verify decrypted broadcast information by using a preset RSU public key.

In a possible design, the sending module 401 is further configured to send the identity information and a payment status, and if the payment status corresponds to a payment success state, permission of the terminal device meets a preset permission requirement.

It should be noted that the terminal device provided in this embodiment may be configured to perform the steps performed by a terminal device side in any one of the foregoing method embodiments. Specific implementations and technical effects are similar to those of the methods in the method embodiments. Details are not described herein again.

Figure 7:
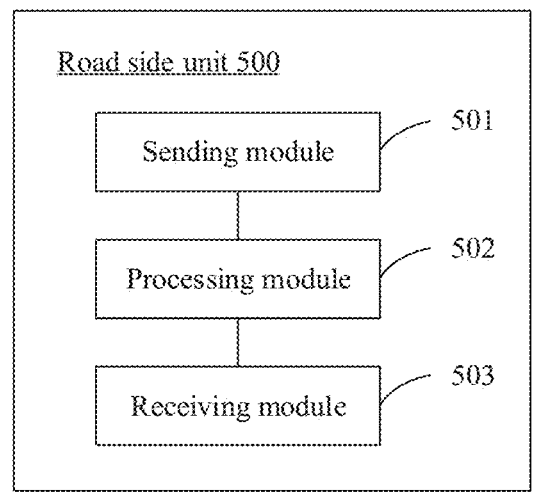
FIG. 7 is a diagram of an example of a structure of a road side unit according to an embodiment of this application.

FIG. 7 is a diagram of an example of a structure of a road side unit according to an embodiment of this application. As shown in FIG. 7, the road side unit 500 provided in this embodiment includes:

a receiving module 503, configured to receive a communication key sent by a CA server, where the communication key is used to encrypt information that is sent externally; and a sending module 501, configured to send encrypted information.

In a possible design, the encrypted information is encrypted broadcast information, and the encrypted broadcast information includes a broadcast identifier.

In a possible design, the road side unit further includes:

a processing module 502, configured to encrypt only information that is sent externally and that meets a preset service type requirement.

In a possible design, the road side unit further includes:

a processing module 502, configured to determine, according to a preset rule, a communication key currently used for encrypting information.

In a possible design, the processing module 502 is further configured to encrypt a first communication key by using a second communication key, where the first communication key is used to encrypt broadcast information; and the sending module 501 is further configured to send an encrypted first communication key according to the preset rule.

In a possible design, the preset rule is a time rule.

In a possible design, the time rule is a preset fixed time period or a preset fixed time point.

In a possible design, the receiving module 503 is further configured to receive a second communication key sequence, where the second communication key sequence includes a plurality of communication keys, and the processing module 502 is further configured to sequentially select, according to the time rule, a communication key in the second communication key sequence as a communication key for encrypting information.

In a possible design, the processing module 502 is further configured to sign the broadcast information by using a road side unit RSU private key;

the processing module 502 is further configured to encrypt the broadcast information by using the communication key; and the sending module 501 is further configured to send encrypted information.

In a possible design, the processing module 502 is further configured to encrypt the broadcast information by using the communication key; and the processing module 502 is further configured to sign the encrypted broadcast information by using a road side unit RSU private key.

In a possible design, the receiving module 503 is further configured to receive identity information and payment information, where the identity information is used to represent an identity of an on board unit OBU, and the payment information is used to determine a payment status of the OBU; and the sending module 501 is further configured to send the identity information and the payment status.

It should be noted that the road side unit provided in this embodiment may be configured to perform the steps performed by a road side unit side in any one of the foregoing method embodiments. Specific implementations and technical effects are similar to those of the methods in the method embodiments. Details are not described herein again.

Figure 8:
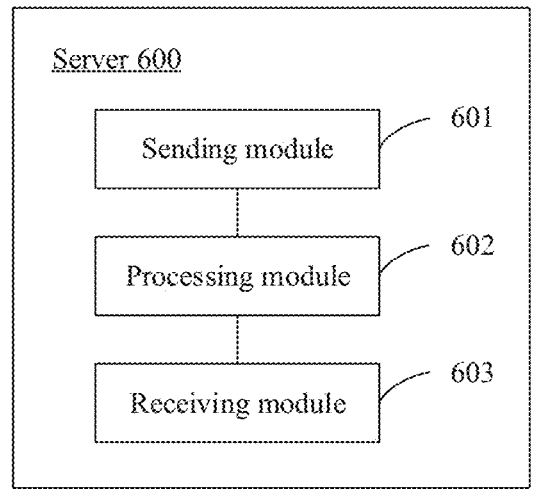
FIG. 8 is a diagram of an example of a structure of a server according to an embodiment of this application.

FIG. 8 is a diagram of an example of a structure of a server according to an embodiment of this application. As shown in FIG. 8, the server 600 provided in this embodiment includes:

a receiving module 603, configured to receive certificate request information, where the certificate request information includes identity information of a terminal device;

a processing module 602, configured to determine permission of the terminal device based on the identity information; and a sending module 601, configured to send a communication key to the terminal device, where the sending module 601 is further configured to send the communication key to a road side unit RSU according to a preset rule, and the communication key is used to encrypt information that is sent by the RSU externally.

In a possible design, the processing module 602 is further configured to sign the certificate request information by using a CA server private key, to generate the communication certificate, where the certificate request information includes a first public key; and the sending module 601 is further configured to send the communication certificate, where the communication certificate is used to establish a transmission channel between the terminal device and the CA server.

In a possible design, the processing module 602 is further configured to encrypt the communication key by using the first public key.

In a possible design, the processing module 602 is further configured to establish a secure transmission channel with the terminal device based on the communication certificate; and the sending module 601 is further configured to send the communication key through the secure transmission channel.

In a possible design, the receiving module 603 is further configured to receive encrypted certificate request information; and the processing module 602 is further configured to decrypt the encrypted certificate request information.

In a possible design, the receiving module 603 is specifically configured to:
receive certificate request information encrypted by using a CA server public key; or
receive certificate request information encrypted by using a symmetric key and the symmetric key encrypted by using a CA server public key.

In a possible design, the sending module 601 is specifically configured to:
send a second communication key according to the preset rule, where the communication key includes the second communication key, the second communication key is used to encrypt a first communication key, and the first communication key is used to encrypt broadcast information from the RSU.

In a possible design, the preset rule is a time rule.

In a possible design, the time rule is a preset fixed time period or a preset fixed time point.

In a possible design, the receiving module 603 is further configured to re-receive the certificate request information according to the time rule within a validity period of the communication key, so as to update the communication key.

In a possible design, the sending module 601 is specifically configured to:
send a first communication key sequence, where the first communication key sequence includes a plurality of communication keys, total duration of validity periods of all communication keys in the first communication key sequence is greater than preset duration, and the preset duration is determined based on a parameter of a road section on which the RSU is located.

In a possible design, the receiving module 603 is further configured to receive the identity information and a payment status, where if the payment status corresponds to a payment success state, the permission meets the preset permission requirement.

In a possible design, the processing module 602 is further configured to determine the sent communication key based on a geographical area in which the RSU is located.

It should be noted that the server provided in this embodiment may be configured to perform the steps performed by a server side in any one of the foregoing method embodiments. Specific implementations and technical effects are similar to those of the methods in the method embodiments. Details are not described herein again.

Figure 9:
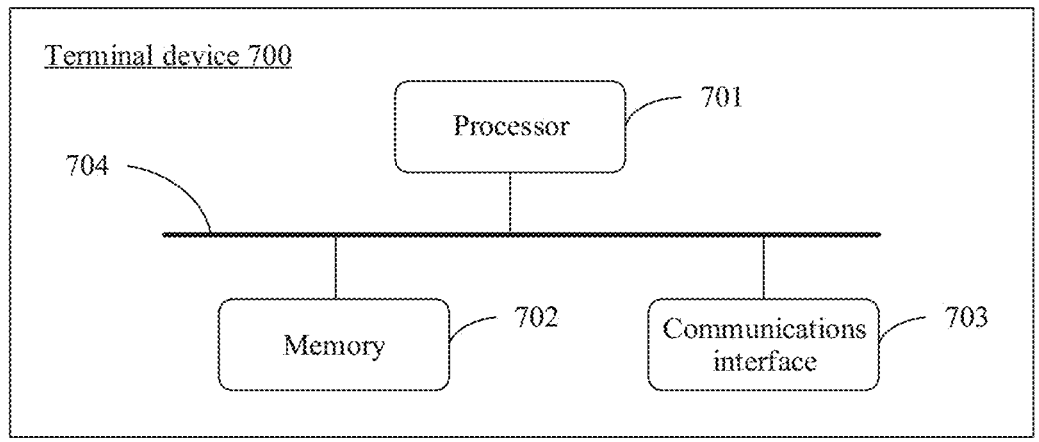
FIG. 9 is a diagram of an example of another structure of a terminal device according to an embodiment of this application.

FIG. 9 is a diagram of an example of another structure of a terminal device according to an embodiment of this application. As shown in FIG. 9, the terminal device 700 provided in this embodiment includes a processor 701, a memory 702, a communications interface 703, and a bus 704.

The processor 701, the memory 702, and the communications interface 703 are connected and communicate with each other through the bus 704. The memory 702 is configured to store computer-executable instructions. When the device runs, the processor 701 executes the computer-executable instructions in the memory 702, to perform, by using a hardware resource in the device, steps on a terminal device side in the communication methods corresponding to FIG. 3 to FIG. 5.

Figure 10:
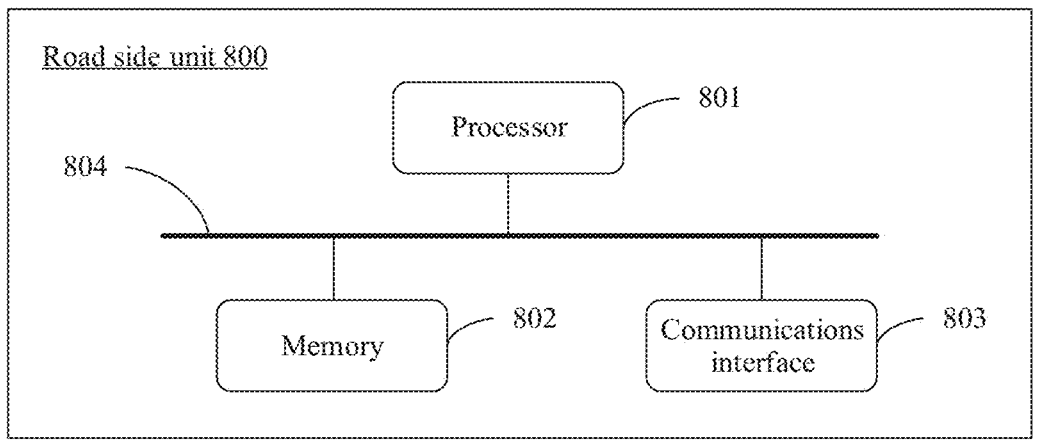
FIG. 10 is a diagram of an example of another structure of a road side unit according to an embodiment of this application.

FIG. 10 is a diagram of an example of another structure of a road side unit according to an embodiment of this application. As shown in FIG. 10, the road side unit 800 provided in this embodiment includes a processor 801, a memory 802, a communications interface 803, and a bus 804.

The processor 801, the memory 802, and the communications interface 803 are connected and communicate with each other through the bus 804. The memory 802 is configured to store computer-executable instructions. When the device runs, the processor 801 executes the computer-executable instructions in the memory 802, to perform, by using a hardware resource in the device, steps on a road side unit side in the communication methods corresponding to FIG. 3 to FIG. 5.

Figure 11:
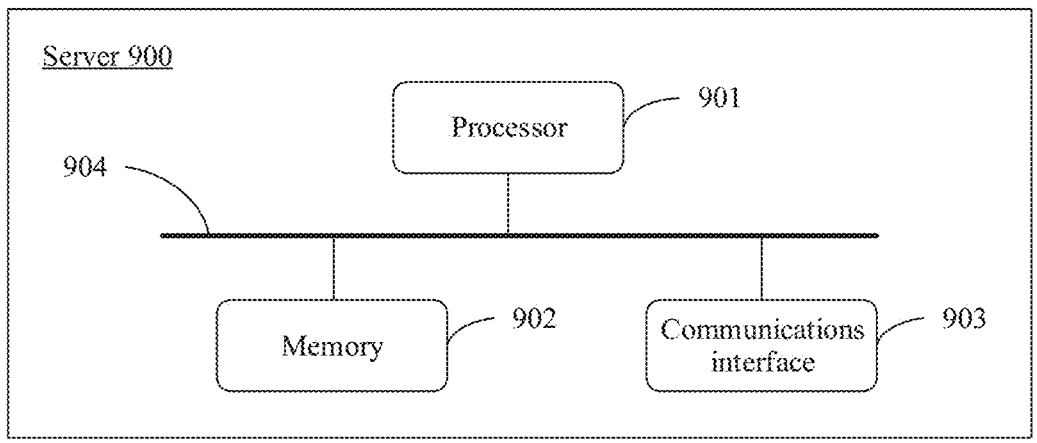
FIG. 11 is a diagram of an example of another structure of a server according to an embodiment of this application.

FIG. 11 is a diagram of an example of another structure of a server according to an embodiment of this application. As shown in FIG. 11, the server 900 provided in this embodiment includes a processor 901, a memory 902, a communications interface 903, and a bus 904.

The processor 901, the memory 902, and the communications interface 903 are connected and communicate with each other through the bus 904. The memory 902 is configured to store computer-executable instructions. When the device runs, the processor 901 executes the computer-executable instructions in the memory 902, to perform, by using a hardware resource in the device, steps on a server side in the communication methods corresponding to FIG. 3 to FIG. 5.

Still another aspect of the embodiments of this application further provides a communications system, including the terminal device shown in FIG. 9, the road side unit shown in FIG. 10, and the server shown in FIG. 11.

Yet another aspect of the embodiments of this application further provides a computer-readable medium. The computer-readable storage medium stores instructions. When the instructions are run on a computer, the computer is enabled to perform steps on a terminal device side in the communication methods corresponding to FIG. 3 to FIG. 5.

Still yet another aspect of the embodiments of this application further provides a computer-readable medium. The computer-readable storage medium stores instructions. When the instructions are run on a computer, the computer is enabled to perform steps on a road side unit side in the communication methods corresponding to FIG. 3 to FIG. 5.

A further aspect of the embodiments of this application further provides a computer-readable medium. The computer-readable storage medium stores instructions. When the instructions are run on a computer, the computer is enabled to perform steps on a server side in the communication methods corresponding to FIG. 3 to FIG. 5.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A terminal device, comprising at least one processor and at least one memory storing instructions, and the at least one processor is coupled to the at least one memory to execute the instructions to:
    receive a trigger instruction at a preset node location of a road section;
    in response to receiving the trigger instruction, send certificate request information to a certificate authority (CA) server to request a communication key, wherein the certificate request information comprises identity information of the terminal device;
    receive the communication key from the certificate authority (CA) server;
    receive encrypted information from a road side unit (RSU), wherein the encrypted information is information encrypted by using the communication key; and
    decrypt the encrypted information by using the communication key.

2. The terminal device according to claim 1, wherein the identity information of the terminal device is used to determine that the terminal device meets a preset permission requirement for obtaining the communication key.

3. The terminal device according to claim 1, wherein the trigger instruction is used to trigger sending the certificate request information to the certificate authority (CA) server.

4. The terminal device according to claim 1, wherein the encrypted information is encrypted broadcast information.

5. The terminal device according to claim 1, wherein the communication key received by the terminal device is encrypted with a key shared between the terminal device and the certificate authority (CA) server, or the communication key received by the terminal device is sent in a secure transmission channel between the terminal device and the certificate authority (CA) server.

6. The terminal device according to claim 1, wherein the at least one processor is coupled to the at least one memory to execute the instructions to:
    determine, according to a preset rule, that the communication key is used for decrypting the encrypted information.

7. The terminal device according to claim 6, wherein the preset rule is a time rule.

8. The terminal device according to claim 7, wherein the at least one processor is coupled to the at least one memory to execute the instructions to:
    receive a communication key sequence from the certificate authority (CA) server, wherein the communication key sequence comprises the communication key; and
    determine, according to the time rule, the communication key is used for decrypting the encrypted information.

* * * * *